United States Patent [19]

Miura et al.

[11] Patent Number: 5,026,337
[45] Date of Patent: Jun. 25, 1991

[54] SUPPORTING DEVICE OF A PLANETARY RING GEAR FOR AN AUTOMATIC TRANSMISSION

[75] Inventors: Masakatsu Miura, Kariya; Masahiko Ando, Okazaki, both of Japan

[73] Assignee: Aisin AW Co., Ltd., Anjo, Japan

[21] Appl. No.: 300,530

[22] Filed: Jan. 23, 1989

Related U.S. Application Data

[63] Continuation-in-part of Ser. No. 127,358, Dec. 1, 1987.

[30] Foreign Application Priority Data

Dec. 9, 1986 [JP] Japan .................. 61-293663

[51] Int. Cl.⁵ .................. F16H 1/28; F16H 47/06
[52] U.S. Cl. .................. 475/283; 475/59
[58] Field of Search .................. 74/740, 750 R, 785; 475/55, 58, 59, 207, 282, 283

[56] References Cited

U.S. PATENT DOCUMENTS

| | | | |
|---|---|---|---|
| 4,056,988 | 11/1977 | Kubo et al. | 74/740 X |
| 4,222,289 | 9/1980 | Watanabe et al. | 475/59 |
| 4,241,622 | 12/1980 | Kubo et al. | 74/740 |
| 4,241,622 | 12/1980 | Kubo et al. | 475/59 |
| 4,426,891 | 1/1984 | Kubo et al. | 74/740 |
| 4,607,541 | 8/1986 | Miura et al. | 74/750 R X |
| 4,730,517 | 3/1988 | Hamano et al. | 74/750 R X |
| 4,747,323 | 5/1988 | Kiuchi et al. | 475/59 |
| 4,903,548 | 2/1990 | Hayakawa et al. | 475/59 |
| 4,934,215 | 6/1990 | Miura et al. | 475/283 |

FOREIGN PATENT DOCUMENTS

| | | | |
|---|---|---|---|
| 0961671 | 1/1975 | Canada | 74/750 R |
| 3741746 | 6/1988 | Fed. Rep. of Germany | 475/283 |
| 0038249 | 2/1986 | Japan | 74/750 R |
| 93546 | 4/1987 | Japan | 475/283 |
| 2181799 | 4/1987 | United Kingdom | 475/283 |

Primary Examiner—Allan D. Herrmann
Assistant Examiner—Khoi Q. Ta
Attorney, Agent, or Firm—Kanesaka and Takeuchi

[57] ABSTRACT

A ring gear of a dual planetary gear, or a big ring gear is fixed on a peripheral section of a disc type supporting member, and both sides of the supporting member are supported by thrust bearings situated in small radius section of the supporting member. The ring gear of the planetary gear unit is fixed on the peripheral section of the disc type supporting member. The supporting member is held and supported between a side of a carrier of the planetary gear unit and a boss section on a counter gear through thrust bearings. The ring gear rotates when an automatic transmission operates. Then the supporting member also rotates, but the bearings are situated at a portion where rotative speed is low, so that the bearings receive thrust force based on the low speed rotation. The supporting member has a groove and a step-like section to set the bearings.

3 Claims, 4 Drawing Sheets

FIG. 3

| | | FIRST AUTOMATIC TRANSMISSION MECHANISM 1 | | | | | | SECOND AUTOMATIC TRANSMISSION MECHANISM 27 | | |
|---|---|---|---|---|---|---|---|---|---|---|---|
| | | C1 | C2 | B1 | B2 | B3 | F1 | F2 | C3 | B4 | F3 |
| P | | | | | | | | | | ○ | |
| R | | | ○ | | | ○ | | | | ○ | |
| N | | | | | | | | | | ○ | |
| D | 1 | ○ | | | | | | ○ | | ○ | ○ |
| | 2 | ○ | | (○) | ○ | | ○ | | | ○ | ○ |
| | 3 | ○ | | (○) | ○ | | ○ | | ○ | | |
| | 4 | ○ | ○ | | ○ | | | | ○ | | |
| 3 | 1 | ○ | | | | | | ○ | | ○ | ○ |
| | 2 | ○ | | ○ | ○ | | ○ | | | ○ | ○ |
| | 3 | ○ | | ○ | ○ | | ○ | | ○ | | |
| 2 | 1 | ○ | | | | | | ○ | | ○ | ○ |
| | 2 | ○ | | ○ | ○ | | ○ | | | ○ | ○ |
| 1 | 1 | ○ | | | | ○ | | ○ | | ○ | ○ |
| | 2 | ○ | | ○ | ○ | | ○ | | | ○ | ○ |

SUPPORTING DEVICE OF A PLANETARY RING GEAR FOR AN AUTOMATIC TRANSMISSION

CROSS-REFERENCE TO RELATED APPLICATION

This is a continuation-in-part application of Ser. No. 127,358 filed on Dec. 1, 1987.

BACKGROUND OF THE INVENTION

1. Field of the Invention

The present invention relates to an automatic transmission having a planetary gear unit, in detail to a supporting structure of a ring gear.

2. Description of the Related Art

The applicant of the present invention has proposed, as shown in Japanese Laid Open Patent No. Sho-62-141341, an automatic transmission including an automatic transmission mechanism attaining forward three speed by the following structure: the automatic transmission mechanism attaining forward three speed includes a planetary gear having a single and dual planetary gears; sun gears of both planetary gears are commonly linked; carriers of both planetary gears are commonly linked; the carrier is connected to a counter (drive) gear which is an output member; an input shaft and a ring gear of the single planetary gear are connected through a first clutch; the input shaft and the sun gear are connected through a second clutch; the sun gear is restrained by a first brake or a second brake through a first one-way clutch; a ring gear of the dual planetary gear is restrained by a third brake or a second one-way clutch; the forward three speeds are obtained by operation of the respective clutches and brakes at required moment.

A front end of the ring gear of the dual planetary gear, or a big diameter ring gear is fixed with an outer race of the second one-way clutch, while a rear end of the big ring gear supports and fixes a supporting plate extending inner side. The supporting plate is rotationally supported between a front side carrier and the ring gear of the single planetary gear through thrust bearings.

Because of the above structure, the thrust bearing which supports the big ring gear has to be situated outside from the ring gear of the single planetary gear, or a small diameter ring gear, so that a portion where thrust bearings are located has bigger radius, and subsequently, rotative speed there is higher. Accordingly, problems on durability of the bearings may occur.

Assembly work is quite laborious because one end of the ring gear of the dual planetary gear is fixed on the outer race of the one-way clutch, and another end is fixed on the supporting plate which is situated radially downward.

SUMMARY OF THE INVENTION

The present invention is purposed to provide a supporting device of a planetary ring gear for an automatic transmission, in a supporting plate of the ring gear is supported at a smaller radius portion through thrust bearing.

The present invention, taking the above mentioned situation into consideration, provides, for example, as shown in FIG. 1, a supporting device of a planetary ring gear for an automatic transmission including a planetary gear unit (2) and a counter gear (5) connecting certain rotating element (CR1) of said planetary gear unit (2). A ring gear (R2) of the planetary gear unit (2) which is fixed on a peripheral section (4a) of a disc type supporting member (4) whose both sides of inner diameter side are held and supported between a side surface of a carrier (CR1) of the planetary gear unit (2) and an end of a boss section (5a) of the counter gear (5) through thrust bearings (7), (8).

The planetary gear unit (2) is constituted by a single planetary gear (30) and a dual planetary gear (31), and a sun gear (S1) is commonly constituted for both planetary gears, the carrier (CR1) is commonly constituted for both planetary gears and the ring gear which is supported by the disc type supporting member (4) is a ring gear (R2) of the dual planetary gear (31).

Furthermore, the disc type supporting member (4) is formed with indent so that the disc type supporting member (4) has tubular groove (4b), and one thrust bearing (7) contacts with the groove (4b) and another thrust bearing (8) contacts with a section (4c) of inner diameter side of the indent, which is constituted in opposite side of said groove (4b).

The ring gear (R2) and the supporting member (4) are fixed by a spline (4a) and a snap ring (9).

Based on the above structure, when the automatic transmission (A) operates, the ring gear (R2) of the planetary gear unit (2) rotates. The ring gear (R2) is supported in a manner that the supporting member (4) to which the ring gear (R2) is fixed is supported between the carrier (CR1) and the counter gear boss (5a) through the thrust bearings (7), (8). Accordingly, the supporting member (4) rotates with the ring gear (R2). However the thrust bearings (7), (8) are situated at the portion where rotative speed is low, at which the bearings receive thrust force caused by low speed rotation.

For assembly work, the counter gear (5) and one of the thrust bearing (8) are assembled in the case (6), after that, the supporting member (4) is inserted in the inner surface of the ring gear (R2), and the sub assembly which is fixed by the snap ring (9) and the like is installed. After this, the carrier (CR1) in inserted.

Incidentally, the reference numerals in the prentheses are used only for reference with the drawings and do not define the invention. The same number may be named differently in the following description and in the previous description in which broader concepts are adopted.

BRIEF DESCRIPTION OF THE DRAWINGS

In the drawings:

FIG. 3 is a table of operation of the automatic transmission;

DETAILED DESCRIPTION OF THE PREFERRED EMBODIMENTS

The present invention will now be explained along with the drawings.

Figure 2:
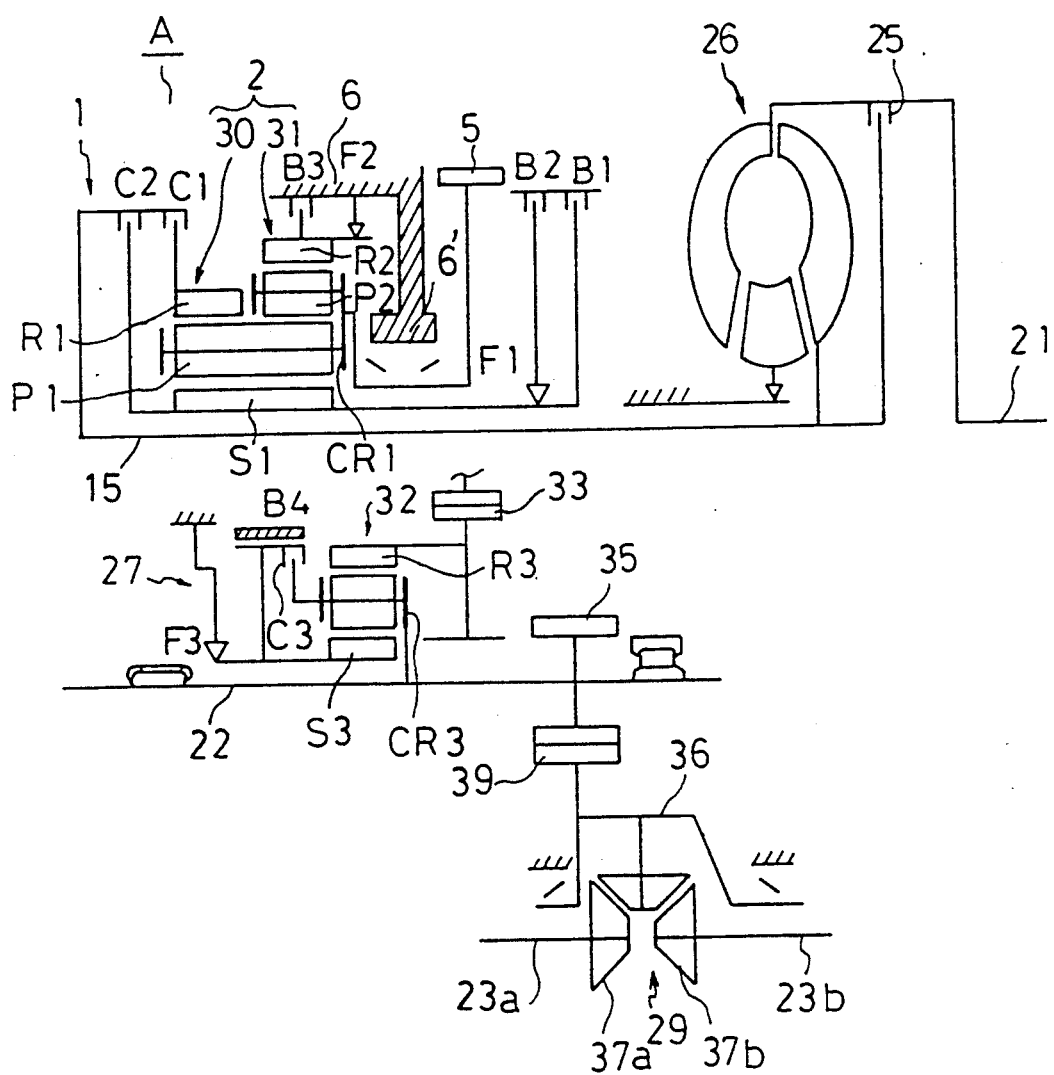
FIG. 2 is a schematic representation of an automatic transmission to which the present invention is applied.

The automatic transmission A, as shown in FIG. 2, has three shafts: an input shaft 15 lined up with an engine crank shaft 21, a counter shaft 22 and a front axle shaft formed of shafts 23a, 23b. On the input shaft 15, a torque converter 26 which has a lock-up clutch 25 and a first automatic transmission mechanism 1 are supported. On the counter shaft 22, a second automatic transmission mechanism 27 is supported and on the front axle shafts 23a and 23b, a front differential device 29 is supported.

The first automatic transmission mechanism 1 has a planetary gear unit 2 which is constituted by a single planetary gear 30 and a dual planetary gear 31. In this planetary gear unit 2, the sun gear are commonly linked to form a sun gear S1, and the carriers are commonly linked to form a common carrier CR1. The pinion meshing with the sun gear S1 is a long pinion P1. And the input shaft 15 and the ring gear R1 of the single planetary gear 30 connect together through the first (forward) clutch C1. The input shaft 15 and the sun gear S1 connect together through the second (reverse & direct) clutch C2. The sun gear S1 is stopped directly by the first brake B1, and one-way rotation of the sun gear S1 is stopped by the second brake B2 through the first one-way clutch F1. The ring gear R2 of the dual planetary gear 31 is stopped by the third brake B3 directly and stopped in one-way rotation by the second one-way clutch F2. And a carrier CR1 is connected to the counter drive gear 5 supported by the case supporting wall 6'. This gear 5 is an output member of the automatic transmission mechanism 1.

The second automatic transmission mechanism 27 has a single planetary gear 32 whose carrier CR3 and the sun gear S3 are connected through a third (direct) clutch C3. The sun gear S3 is stopped directly by the fourth (under drive) brake B4 and the one-way rotation of the sun gear S3 is also stopped by the third one-way clutch F3. The ring gear R3 is connected to a counter driven gear 33 engaging with the counter drive gear 5, which is an the input member of the automatic transmission mechanism 27. The carrier CR3 connects to the counter shaft 22. Furthermore, on the counter shaft 22, a reduction gear 35 which is an output member of the second automatic transmission mechanism 27 is fixed.

A front differential device 29 has a differential carrier 36 and a left and right side gears 37a and 37b. A ring gear 39 is fixed on a differential carrier 36 which a gear mount case. And the ring gear 39 makes up a final reduction mechanism by meshing with the reduction gear 35. The left and right side gears 37a and 37b connect respectively to the left and right front axle shafts 23a and 23b.

The explanation of the operation of automatic transmission A will be shown along with FIG. 3.

The rotation of the engine crank shaft 21 is transmitted to the input shaft 15 through the torque converter 26 or through the lock-up clutch 25. At the first speed of D range, the first clutch C1 is engaged and the fourth brake B4 is actuated. At this state, in the first automatic transmission mechanism 1, the rotation of the input shaft 15 is transmitted to the ring gear R1 of the single planetary gear 30 through the first clutch C1. While the rotation of the ring gear R2 of the dual planetary gear 31 is stopped by the second one-way clutch F2. So the forward rotation of the carrier CR1 is reduced sharply, while idling the sun gear S1 reversely, and the rotation is taken out from the counter drive gear 5. At the second automatic transmission mechanism 27, the sun gear S3 is stopped by the fourth brake B4 and the third one-way clutch F3. The rotation from the counter driven gear 33 is taken out from the ring gear R3 to the carrier CR3 as a reduced rotation. Therefore, the first speed of the first automatic transmission mechanism 1 and the reduced rotation of the second automatic transmission mechanism 27 are combined. The rotation made by this process is transmitted to the front differential device 29 through the reduction gear 35 and the ring gear 39 and then to the left and right front axle shafts 23a and 23b.

At the second speed of D range, the second brake B2 operates besides the engagement of the first clutch C1 and the operation of the fourth brake B4. Then the rotation of the sun gear S1 is stopped by the operation of the first one-way clutch F1 based on the brake B2. Therefore, the rotation from the input shaft 15 to the ring gear R1 reduces the rotation of the carrier CR1 in the forward direction and the ring gear R2 of the dual planetary gear 31 idles in the forward direction. The reduced rotation of the carrier CR1 is brought to the counter drive gear 5 as the second speed. Furthermore, the second automatic transmission 27 is kept at a reduced rotation state. The rotation made by the combination of the second speed of the automatic transmission mechanism 1 and the reduced rotation of the second automatic transmission mechanism 27 is transmitted to the front axle shafts 23a and 23b.

At this state, the first brake B1 operates so that a large transmission torque reaction at the up-shift can be divided to both the first brake B1 and the second brake B2 and supported. And also an engine brake can be operated at the coast.

At the third speed of D range, the first automatic transmission mechanism 1 which remains the second speed, and the fourth brake B4 of the second automatic transmission mechanism 27 is released, the third clutch C3 is engaged. Then the carrier CR3 and the sun gear S3 work together and the planetary gear 32 rotates so that the direct rotation is taken out to the counter shaft 22. At this state, the fourth brake B4 is released earlier than the engagement of the third clutch C3, so shifting is conducted under the condition that power transmission is secured by the operation of the third one-way clutch F3, which means the one-way clutch F3 prevents the power transmission from being unable to transmit. Therefore, the second speed rotation of the first automatic transmission 1 and the direct rotation of the second automatic transmission mechanism 27 are combined, so that the third speed mode is obtained in the automatic transmission A as a whole.

The fourth speed mode at D range, the second clutch C2 is engaged after the third speed mode. Then the rotation is transmitted to the ring gear R1 from the input shaft 15 through the first clutch C1 and to the sun gear S1 through the second clutch C2. And the planetary gear unit 2 rotates wholly so that the direct rotation is transmitted to the counter drive gear 5. Then the direct rotation of the first automatic transmission mechanism 1 and the direct rotation of the second automatic transmission mechanism 27 are combined, while the counter drive gear 5 and the driven gear 33 are under certain accelerating condition, so that the over drive rotation is obtained in the automatic transmission A. In this process, when the first brake B1 operates at the second and the third speeds, the first brake B1 is released earlier at the up shift to the fourth speed and the sun gear S1 is stopped by the first one-way clutch F1. The second clutch C2 is engaged, so the shift shock caused by the shifting can be prevented.

A third range is the same as the state when first brake B1 operates at the first and second speeds in the first, the second and third speeds of the D range.

A second range is the same as the state of the first and second speed at the third range.

Furthermore, at a first range, not only the first clutch C1 is engaged and the fourth brake B4 operates but also the third brake B3 operates. At this state, besides the stopping of the ring gear R2 by the second one-way clutch F2, the third brake B3 is actuated whichever the direction of the rotation may be and operates the engine brake. The second speed mode is the same as the second speed mode of the second range.

At a reverse range, the second clutch C2 is engaged, while the third brake B3 and the fourth brake B4 operate. At this state, the rotation of the input shaft 3 is transmitted to the sun gear S1 through the second clutch C2. As the ring gear R2 of the dual planetary gear 31 is fixed by the operation of the third brake B3, the carrier CR1 rotates reversely by rotating the ring gear R1 of the single planetary gear 30 reversely. Then the reverse rotation is brought to the counter drive gear 5. Furthermore, the reverse rotation of the counter drive gear 5 is reduced by the second automatic transmission mechanism 27 and is transmitted to the transaxle shafts 23a and 23b.

Next, an explanation on an embodiment which materializes the above automatic transmission A is given.

The automatic transmission A has an integral casing made up by a transaxle case 6, a transaxle housing 41, a rear cover 42. In the integral casing, an input shaft 15, a counter shaft 22 and a ring gear mount case 36 which is the differential carrier of the front differential device 29 are all free rotationally. On the input shaft 15, a torque converter 26 having a lock-up clutch 25 and the first automatic transmission mechanism 1 are arranged, and on the counter shaft 22, the second automatic transmission mechanism 27 is arranged. A valve body 44 is arrange in the transaxle case 6.

In the first automatic transmission mechanism 1, a brake section 43, an output section 45, a planetary gear. unit 2 and a clutch section 47 are arranged in order from the front side of the engine crank shaft to the back side. Between the brake section 43 and the torque converter 26, an oil pump 49 is arranged and a hollow shaft 50 enclosing the input shaft 15 is free rotationally supported.

The planetary gear unit 2 is made up of a single planetary gear 30 and a dual planetary gear 31 (refer to FIG. 2). The single planetary gear 30 is made up of a sun gear S1 arranged on the hollow shaft 50, a ring gear R1 and a carrier CR1 supporting a pinion P1 engaging with these gears. The dual planetary gear 31 is made up of the sun gear S1 arranged on the hollow shaft 50, a ring gear R2 and the carrier CR1 supporting a first pinion P1 engaging with the sun gear S1 and supporting a second pinion P2 engaging with the ring gear R2. These planetary gears 30 and 31 are composed of a common sun gear having single gear which has the same number of gear teeth. The carrier CR1 is constituted integrally, and the pinion P1 is composed of a long pinion.

At the brake section 43, a first one-way clutch F1, a first brake B1 made of multi-plates and a second brake B2 made of multi-plates are arranged. Furthermore, a hydraulic actuator 51 is arranged adjacent to the first brake B1 and the hydraulic actuator 52 is arranged adjacent to the second brake B2. Both actuators 51 and 52 are fixed on the cover of an oil pump 49 and arranged in order to the radial direction. Furthermore, the first brake B1 is connected to the hollow shaft 50. An inner race of the first one-way clutch F1 connects to the hollow shaft 50 and the outer race connects to the second brake B2.

Figure 1:
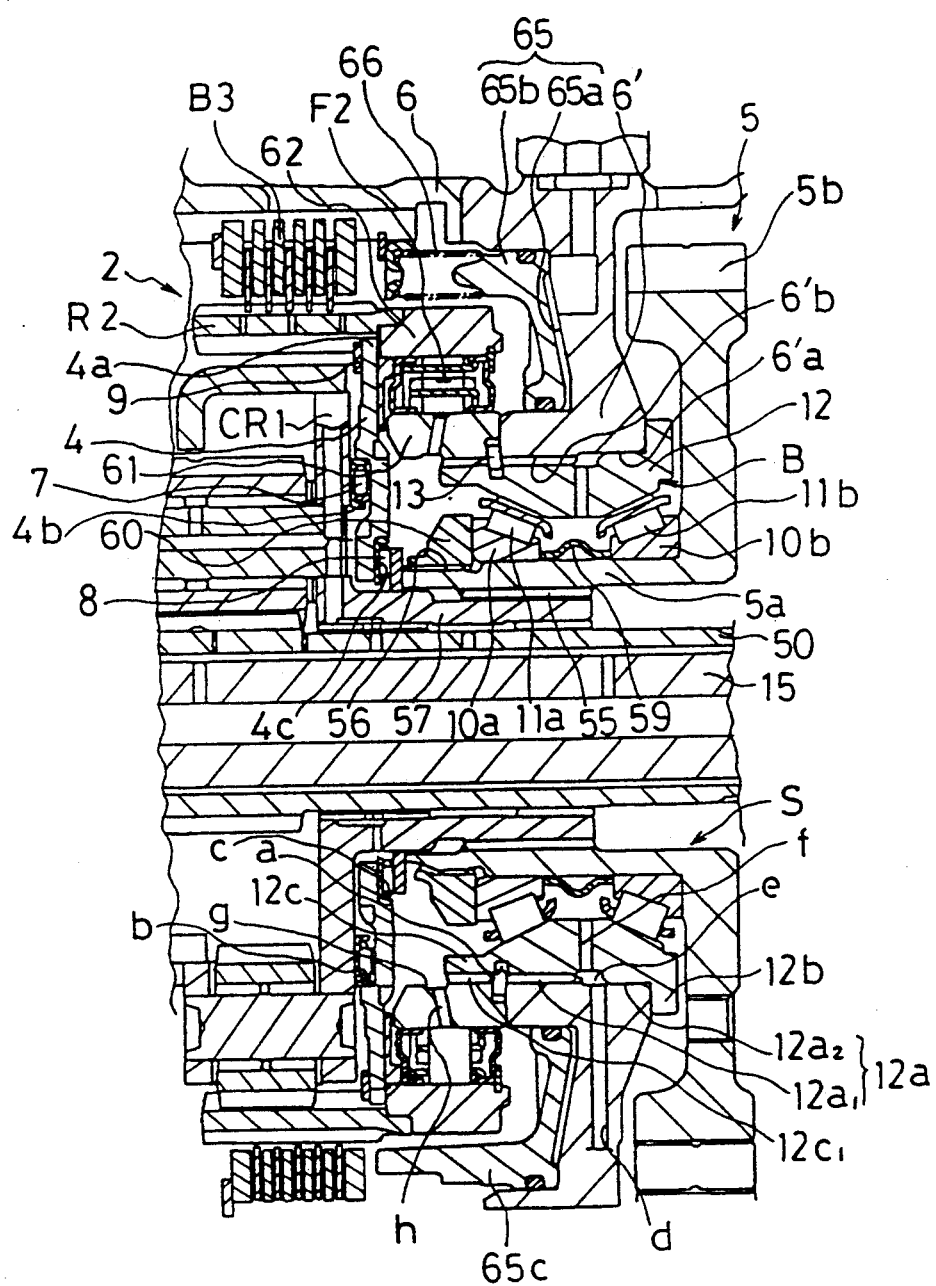
FIG. 1 is a cross sectional view of a supporting device of a planetary ring gear which relates to the present invention.

The output section 45 is placed in the nearly middle of the first automatic transmission mechanism 1 and has the counter drive gear 5. The counter drive gear 5, as shown in FIG. 1, has a boss 5a with a certain length and a gear section 5b of a large diameter. A spline 55 is arranged on the inner surface of the boss 5a whose rear edge has a spline 56 with a certain length. The outer surface of the boss of the counter drive gear 5 is free rotationally supported by the supporting wall 6' arranged in the transaxle case 6 through the bearing unit B. The boss 57 of the carrier CR1 is spline-coupled with the spline 55. The bearing unit B comprises double rows of inner races 10a and 10b, double rows of tapered roller 11a and 11b and double tapered bearing having an outer race 12. On the outer surface of the boss 5a, double rows of inner races 10a and 10b enclose, while a rigid spacer 59 is placed between the races 10a and 10b. A nut 60 is set on the spline 56 with a certain pre-load provided. An outer race 12 has a mating section 12a enclosed on the case supporting wall 6', a brim section 12b bulging radially at the front edge side of the mating section 12a and an elongated section 12c having a certain length at the back edge of the mating section. Furthermore, the mating section 12a is composed of a position section 12a2 and a spline section 12a1. On the elongated section 12c, a spline 12c1 elongated from the spline section 12a1 is arranged. At the elongated section 12c, a concaved groove 'a' whose back edge surface is made of a tapered surface is arranged. As a tapered snap ring 13 is arranged on the concaved groove, a case positioning section 6'a is held so that a certain tension force works on the outer race 12, or between the brim section 12c and the snap ring 13. In the outer race 12, the positioning section 12a2 is positioned by touching the position section 6a of the case supporting surface, the spline section 12a1 is engaged with the spline section 6'b and the rotation is stopped. Furthermore, on the outer portion of the elongated section 12c, an inner race 61 of the one-way clutch F2 is supported with spline. And on the case supporting wall 6' lubrication oil hole 'd' is arranged. The lubrication oil from the hole 'd' is supplied to a space 'e' between the positioning section 12a2 at the outer race of the mating surface 12a and the spline section 12a1. And the lubrication oil is supplied from the space 'e' to the tapered rollers 11a and 11b through the oil hole 'f' arranged in the outer race 12, and then to the splines 12a1 and 12c1. The edge of inner portion of the inner race 61 at the second one-way clutch F2 has a circular concave 'g' by slightly expanding inside the inner portion. An oil hole 'h' is arranged from the concave 'g' to a sprag of the one-way clutch F2. Therefore, oil which passes through the splines 12c1, 12a1 and the roller 11a is kept in the concave 'g' and supplied to the one-way clutch F2 through the oil hole 'h'.

An outer race 62 of the second one-way clutch F2 is fixed on the ring gear R2 of the dual planetary gear 31, and a spline 4a arranged on the outer surface of the circular supporting member 4 is engaged to the gear section of the ring gear R2. Furthermore, as the supporting member 4 is engaged to the snap ring ditch where the snap ring 9 is installed on the gear surface, the ring gear R2 and the supporting member 4 are coupled. The supporting member 4 is held between the counter gear boss section 5a and the carrier CR1 through the thrust bearings 7 and 8 which are arranged at the both surfaces 4b and 4c of the inner portion of the supporting member 4. By this structure, the outer race 62 of the one-way clutch F2 and the ring gear R2 are supported by the supporting member 4 in the middle of the total axial length of the ring gear R2 and the outer race 62. At the inner section of the supporting member 4, a groove 4b is formed by the pressing process, where one of the thrust bearing 7 is arranged and seated on the shoulder 'b'. The other thrust bearing 8, seating on the shoulder 'c' made by the structure of the concaved groove 4b, is arranged in a section 4c. Therefore, the second one-way clutch F2 is arranged between the planetary gear unit 2 and the case supporting wall 6', side by side, in the axial direction.

Between the outer portion of the ring gear R2 and the axle case 6, a third brake B3 is placed. On one side surface of the supporting wall 6', a cylinder 65a, where a hydraulic actuator 65b composed of a piston 65 is so situated as to be enclosed in the second one-way clutch F2, is arranged. Furthermore, the hydraulic actuator 65 has an arm 65c of comb-shaped cylinder. This arm 65c stretches to the axial direction passing over the outer portion of the second one-way clutch F2 and controls the third brake B3. A return spring 66 is arranged on the comb-shaped part of the arm 65c.

Figure 4:
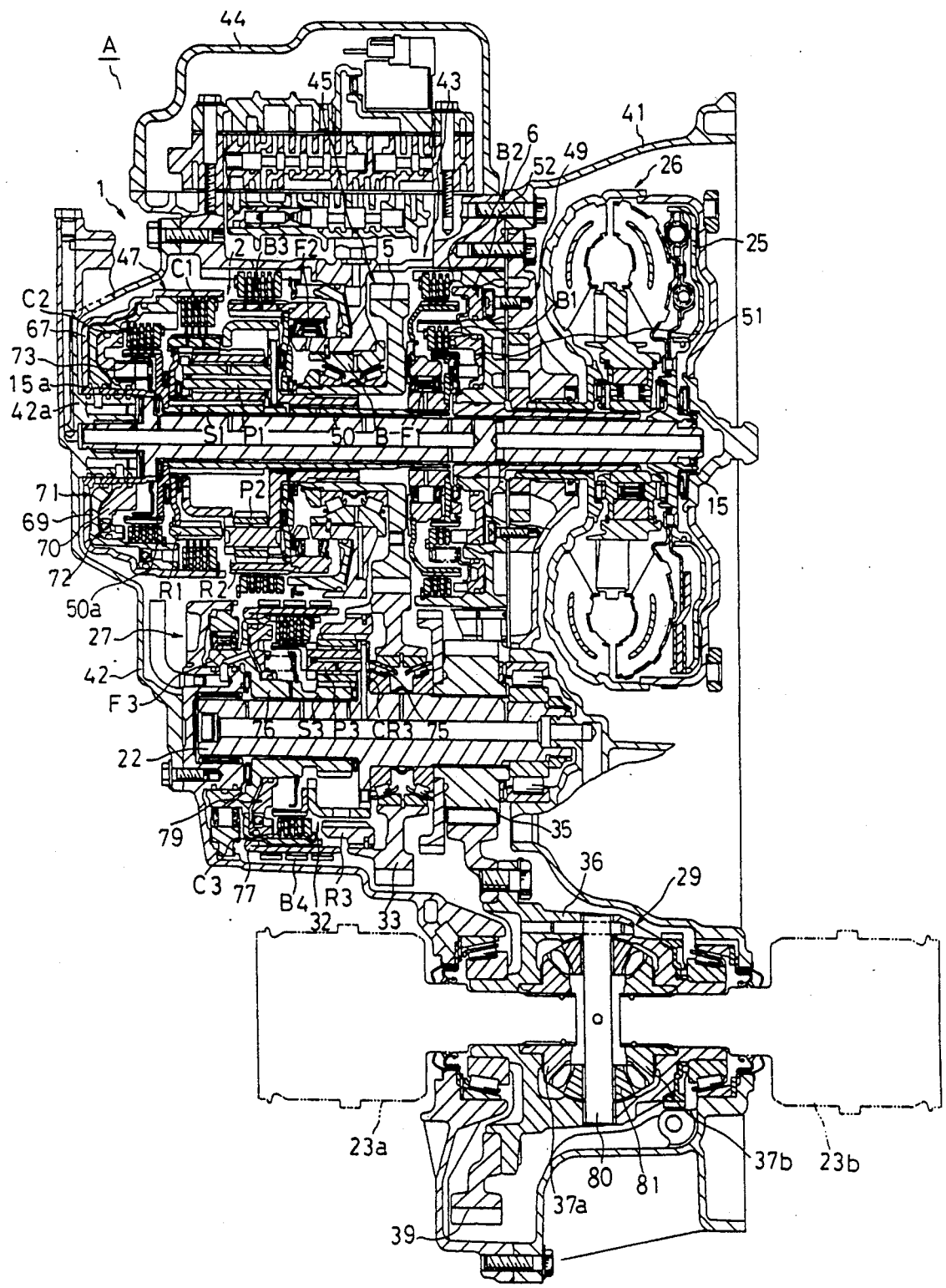
FIG. 4 is a cross sectional view of the whole automatic transmission.

And the clutch section 47 has, as shown in FIG. 4, a first (forward) clutch C1 and a second (direct) clutch C2. This clutch section 47 is placed at the rear edge of the first automatic transmission mechanism 1 and housed in the transaxle cover 42. The back edge of the input shaft 15 has also a sleeve 15a enclosing the boss 42a of the cover 42. A clutch drum 67 is connected to the sleeve 15a. Furthermore, in the clutch drum 67, a movable member 69 is enclosed by a spline to freely move in the axial direction. A piston member 70 is enclosed by the movable member 69. The movable member 69 and a cylinder made up by the inner side of the clutch drum 67 constitute an oil chamber, so that a hydraulic actuator 71 for the first clutch C1 is formed. While, the piston member 70 and the cylinder made up by the inner side of the movable member 69 constitute an oil chamber, so that a hydraulic actuator 72 for the second clutch C2 is formed. Furthermore, a spring 73 is set on between the piston member 70 and the ring fixed on the sleeve section 15a. The spring 73 composes a return spring for both piston members 69 and 70 of the hydraulic actuator 71 and 72. The first clutch C1 is arranged between a spline arranged on the inner surface of the outer portion of the clutch drum 67 and a spline arranged on the outer surface of the ring gear R1 The second clutch C2 is arranged between a spline arranged on the inner surface of the outer portion of a movable member 69 and a spline arranged on the outer portion of a hub 50a fixed on the hollow shaft 50.

While, the second automatic transmission mechanism 27 has a single planetarY gear 32 Furthermore, a counter driven gear 33 is free rotationally supported through the bearing 75 and arranged on the counter shaft 22. A reduction gear 35 is fixed on the shaft 22 A ring gear R3 of the planetary gear 32 connects to the counter driven gear 33. The carrier CR3 supporting the pinion P3 is formed by bulging the counter shaft 22 radially. Furthermore, the sun gear S3 is arranged on the hub 76 which is free rotationally supported by the shaft 22. A fourth brake B4 composed of a band brake is engaged with the outer diameter surface of a drum 77 fixed on the outer diameter of the hub 76. Between the inner side of the drum 77 and the hub fixed on the carrier CR3, a third clutch C3 is placed. Furthermore, a piston is enclosed by the hub 76 close to the clutch C3, so that a hydraulic actuator 79 for the clutch C3 is formed. A third one-way clutch F3 is arranged between the elongated section of the hub 76 and the case 6.

The front differential device 29 has a ring gear mount case 36 which forms a differential carrier. This case 36 is free rotationally supported by a housing 41 and a case 6 through a bearing. Furthermore, on the mount case 36, a large diameter ring gear 39 engaging with the reduction gear 35 is fixed. Inside the ring gear 39, a pinion gear 81 is free rotationally supported by the pinion shaft 80, and left and right side gears 37a and 37b engaging with the gear 81 are free rotationally supported. Left and right front axle shafts 23a and 23b are respectively enclosed and connected with the side gears 37a and 37b.

In this embodiment, structured as mentioned above, the ring gear R2 rotates together with the outer race 62 of the second one-way clutch F2, at the forward second, third and fourth speed of the automatic transmission A, as already mentioned. At this state, the ring gear R2 and the outer race 62 are supported well-balancedly by the supporting member 4 almost in the middle of the axial total length of the ring gear R2 and the outer race 62. The supporting member 4 is placed axially, held by the edge surface of the carrier CR1 and the counter gear boss 5a through the thrust bearings 7 and 8 arranged on both sides surfaces of the supporting member 4. Furthermore, while this supporting member 4 rotates together with the ring gear R2, the thrust bearings 7 and 8 are placed at the inner section of the supporting member 4. The rotation speed of the thrust bearings 7 and 8 becomes low and only a little load capacity of them is needed.

Next, an assembly of the automatic transmission A is explained.

At first, an inner race 10b is put in the boss 5a of the counter gear 5 together with a tapered roller 11b. Then rigid spacer 59 is put in and outer race 12 is installed. After putting the other inner race 10a together with a roller 11a, a nut 60 is put on a spline 56 to give a certain pre-load so that a sub assembly S setting a bearing unit B on the counter gear 5 is formed.

The assembly S is arranged on the supporting wall 6' of the transaxle case 6 by inserting the outer race 12 from the front (engine) side At this state, a positioning section 6'a of the outer race 12 contacts a positioning section 12a2 of the case supporting surface and the concentricity of the bearing unit B is secured. And as a spline section 6'b of the outer race 12 engages the spline 12a2 of the case supporting surface, the rotation of the race 12 is prevented. The tapered snap ring 13 is set in the concaved groove 'a' of the outer race 12 from back side of the transaxle case 6. Between a brim section 12b and a snap ring 13, the case supporting wall 6' is held to put the outer race 12 under certain stress condition without rattling, so that the sub assembly S is fixed on the case supporting 6'.

A piston 65b of the hydraulic actuator 65 for the third brake B3 is arranged and the second one-way clutch F2 whose inner race 61 is spline-coupled with the elongated outer race 12c of the bearing unit is arranged. While, the supporting member 4 is put in by engaging the spline section 4a to the gear teeth of the ring gear R2. The supporting member 4 is fixed by the snap ring 9 and becomes a sub assembly with the outer race 62 of the one-way clutch F2. After setting one of the thrust bearing 8, the sub assembly is put in and the other thrust bearing 7 is set at the concaved groove 4b of the supporting member 4. After that, the boss 57 of the carrier CR1 supporting the pinion P1 and P2 is connected to the spline 55 of the counter drive gear boss 5a. Furthermore, the ring gear R1 is installed with its supporting plate, and the hollow shaft 50 is inserted, so that the planetary gear unit 2 is assembled.

The movable member 69, the piston member 70 and the return spring 73 are set in the clutch drum 67 and the second and the first clutches C1, C2 are also installed there, so that the clutch section 47 with the input shaft 15 is formed. The clutch section 47 is installed after the third brake B3 is installed.

On the other hand, the cover on which the hydraulic actuators 51, 52 are fixed is set on the body of the oil pump 49 to form the sub assembly. After installing the first one-way clutch F1, the hub section of the second brake B2 and the hub section of the first brake B1, the sub assembly is arranged and fixed on the case 6 by a bolt. Thus the first automatic transmission mechanism 1 is assembled.

While, the second automatic transmission mechanism 27, the counter driven gear 33 and the reduction gear 35 are installed on the counter shaft 22 to form the sub assembly, and the front differential device 29 is assembled to form the sub assembly. And, the second automatic transmission mechanism 27, the first automatic transmission mechanism 1 and these sub assemblies are set in the cases in a manner that the transaxle housing 41 and the rear cover 42 are fixed on both junction surface of the transaxle case 6 so that the mechanisms 1, 27 and the sub assemblies are supported.

TECHNICAL ADVANTAGES OF THE INVENTION

As explained, the ring gear (R2) of the planetary gear unit (2) is supported by fixing it to a peripheral section (4a) of a disc type supporting member (4), and both sides of the supporting member (4) are held and supported by the side of the carrier (CR1) and the boss section (5a) of the counter gear (5) through the thrust bearings (7), (8), so that these thrust bearings (7), (8) are placed on a sections having small radius. Due to this arrangement, rotating speed of these bearings is small, consequently, durability of the bearings is enchanced, and minimization of axial length is done. Furthermore, assembly work is easy because the supporting member (4) is only fixed between the counter gear (5) and the ring gear (R2).

In particular, the planetary gear unit (2) includes the single planetary gear (30) and the dual planetary gear (31), wherein the sun gears for both planetary gears are commonly linked, and the carriers for both planetary gears are commonly linked. Moreover, the ring gear (R2) which is supported by the disc type supporting member (4) is the ring gear for the dual planetary gear (31). In the above case, the thrust bearings (7), (8) are situated at the spots where rotating speed is small, so that the load capacity of the bearings does not exceed allowable level.

In case that the disc type supporting member (4) is formed to have a groove (4b) where one of the thrust bearings (7) is installed, and in case that another thrust bearing (8) is installed on a step-section (4c) which is constituted in the opposite and radially inner side of the groove (4b), the supporting member (4) with the bearings (7), (8) attached are formed thin, and when assembling of the automatic transmission (A), positioning of these bearings are easy, and work efficiency is improved greatly.

What is claimed is:

1. A supporting device of a planetary ring gear for an automatic transmission including a planetary gear unit with a rotating element, a gear with a boss section connected to the rotating element and a rotating member, comprising, a disc type supporting member for supporting the ring gear of the planetary gear unit, said supporting member having an outer peripheral portion fixed on the ring gear, an inner portion arranged so that a space is formed between the inner portion and the rotating member, and an annular side groove with an indent formed on the inner portion of the supporting member, said annular groove and indent on the supporting member being radially spaced apart from each other, a first thrust bearing situated inside the annular side groove and arranged between the supporting member and the planetary gear and a second thrust bearing situated inside the indent of the supporting member, said second thrust bearing being located at the opposite side of the first thrust bearing and arranged either between the supporting member and the boss section of the gear.

2. A supporting device according to claim 1, wherein said planetary gear unit includes a single planetary gear and a dual planetary gear with sun gears, ring gears and carriers, respectively, said sun gears and carriers of the single and dual planetary gears being integrally connected together, respectively, said ring gear of the dual planetary gear being supported by the disc type supporting member.

3. A supporting device according to claim 1, wherein said annular groove and indent on the supporting member are formed by pressing the supporting member.

* * * * *